United States Patent
Legaspi Felipe et al.

(10) Patent No.: US 11,549,082 B2
(45) Date of Patent: Jan. 10, 2023

(54) CLEANING AGENT COMPRISING A POLYACRYLATE TERPOLYMER FOR REMOVAL OF FOULING DEPOSITS FROM METAL SURFACES

(71) Applicant: Baker Hughes, LLC, Houston, TX (US)

(72) Inventors: Mary Jane Legaspi Felipe, Sugar Land, TX (US); Montgomery Pifer, Kingwood, TX (US); Ramakrishna Ponnapati, Houston, TX (US); Joey Dacula Mangadlao, Agusan del Sur (PH); Anthony Taglione, Houston, TX (US); David N. Fulmer, Missouri City, TX (US); Sara Hartranft, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 206 days.

(21) Appl. No.: 16/576,124

(22) Filed: Sep. 19, 2019

(65) Prior Publication Data

US 2020/0095522 A1    Mar. 26, 2020

Related U.S. Application Data

(60) Provisional application No. 62/734,120, filed on Sep. 20, 2018.

(51) Int. Cl.
  *C11D 3/37*  (2006.01)
  *C11D 3/20*  (2006.01)
  *C23G 1/06*  (2006.01)
  *C10G 75/04* (2006.01)

(52) U.S. Cl.
  CPC ............ *C11D 3/2093* (2013.01); *C10G 75/04* (2013.01); *C11D 3/3749* (2013.01); *C23G 1/06* (2013.01)

(58) Field of Classification Search
  CPC ............ C11D 11/0041; C11D 11/0023; C11D 3/3757
  See application file for complete search history.

(56) References Cited

U.S. PATENT DOCUMENTS

| | | | | |
|---|---|---|---|---|
| 4,885,097 A * | 12/1989 | Amjad | ...................... | C02F 5/12 210/701 |
| 4,952,326 A * | 8/1990 | Amjad | ...................... | C02F 5/12 210/701 |
| 5,277,823 A * | 1/1994 | Hann | ...................... | C02F 5/08 127/61 |
| 6,183,649 B1 | 2/2001 | Fontana | | |
| 8,192,613 B2 | 6/2012 | Stark et al. | | |
| 2009/0114247 A1 | 5/2009 | Brown et al. | | |
| 2010/0311623 A1* | 12/2010 | Rey | ...................... | C09K 8/90 507/259 |
| 2011/0112004 A1 | 5/2011 | Smith et al. | | |
| 2011/0114564 A1* | 5/2011 | Amjad | ...................... | C02F 5/14 210/700 |
| 2013/0252872 A1 | 9/2013 | Olson et al. | | |
| 2016/0251600 A1 | 9/2016 | Dotzauer et al. | | |
| 2016/0326432 A1* | 11/2016 | Felipe | ...................... | C02F 5/105 |
| 2017/0022451 A1* | 1/2017 | Tamareselvy | ......... | C08F 222/02 |
| 2020/0040244 A1* | 2/2020 | Yang | ........................ | C09K 5/10 |

FOREIGN PATENT DOCUMENTS

| | | |
|---|---|---|
| EP | 0595590 A2 | 5/1994 |
| EP | 3068861 A1 | 9/2016 |
| KR | 1020170043653 A | 4/2017 |
| WO | 0058228 A1 | 10/2000 |
| WO | 2016179160 A1 | 11/2016 |
| WO | 2018085217 A1 | 5/2018 |

* cited by examiner

*Primary Examiner* — Charles I Boyer
(74) *Attorney, Agent, or Firm* — Crowe & Dunlevy, P.C.

(57) ABSTRACT

A cleaning agent comprising a polyacrylate terpolymer and a maleic olefin compound may be added to an aqueous system having a metal surface, such as a metal surface of a heat exchanger, in a concentration sufficient to remove fouling deposits from the metal surface in neutral or alkaline conditions. The removal of fouling deposits with the application of the cleaning agent may occur while the system is shut down or in service.

19 Claims, 3 Drawing Sheets pH 7          pH 8

CLEANING AGENT COMPRISING A POLYACRYLATE TERPOLYMER FOR REMOVAL OF FOULING DEPOSITS FROM METAL SURFACES

CROSS-REFERENCE TO RELATED APPLICATION

This application claims the benefit of Provisional Patent Application No. 62/734,120 filed Sep. 20, 2018, which is incorporated by reference herein in its entirety.

TECHNICAL FIELD

The present invention relates to the use of cleaning agents containing a polyacrylate terpolymer and a maleic olefin compound for removing fouling deposits from metal surfaces found in aqueous systems in neutral and alkaline conditions.

BACKGROUND

Fouling of heat exchangers and other equipment employed in industrial aqueous systems can significantly hinder the processes carried out by the equipment in the system.

Fouling of heat exchangers, for example, can increase the overall thermal resistance and can lower the overall heat transfer coefficient of heat exchangers. Fouling can also impede fluid flow, can accelerate corrosion, and can increase pressure drop across the heat exchanger. Furthermore, cleaning of fouled heat exchangers presents a significant challenge to maintenance and operation of heat exchangers in process industries.

Various methods have been used to clean fouling deposits from heat exchanger tubes, either online (i.e. while the system is in operation) and offline (i.e. while the system is shut down), each of which presents advantages and limitations. Some online methods of cleaning of heat exchangers involve adding a weak organic acid to the system. Typically, this type of cleaning is done at pH 6.5 and below. However, cleaning metal surfaces, such as carbon steel surfaces, in such acidic conditions results in more corrosion. Thus, online cleaning of corroded or fouled metal surfaces in industrial systems cannot often be adequately carried out.

Phosphorous-based cleaners, like tetra potassium pyrophosphate ("TKPP"), have also been used to help remove fouling deposits in the form of iron scales from heat exchanger tube surfaces. While the use of TKPP aids in the dispersion and suspension of iron scales, in certain conditions, the addition of TKPP could result in the formation of calcium phosphate scale.

Thus, it is desirable to employ more effective ways to remove fouling deposits, such as iron scales, from metal surfaces in systems containing bulk water while the systems are in operation.

SUMMARY

There is provided, in one form, a method of removing fouling deposits from a metal surface in an aqueous system by introducing a cleaning agent comprising a polyacrylate terpolymer and a maleic olefin compound to the aqueous system, in a concentration sufficient to remove fouling deposits from a metal surface located in the aqueous system.

In one non-limiting embodiment, the removal of fouling deposits occurs in an aqueous system having a pH from about 6.5 to about 9.

In another non-limiting embodiment, there is provided a treated aqueous system, wherein the aqueous system comprises a metal surface and a cleaning agent made up of: from about 0.0001 wt. % to about 1 wt. % polyacrylate terpolymer and from about 0.00001 wt. % to about 0.001 wt. % maleic olefin compound. In one form, the metal surface is the surface of a heat exchanger.

DETAILED DESCRIPTION

Figure 1:
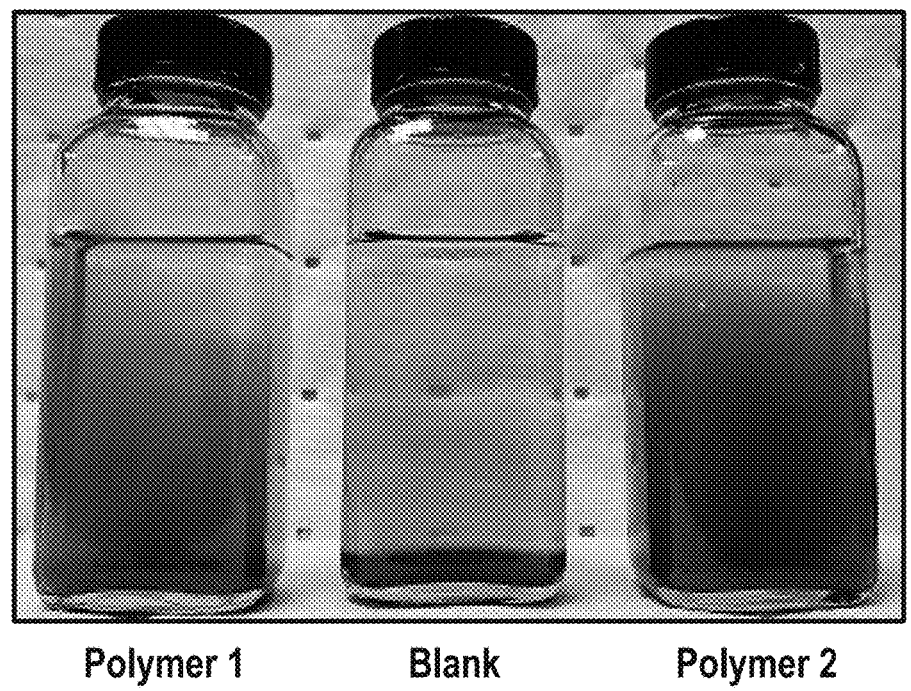
FIG. 1 is a photographic illustration comparing the amount of suspension of rust scales in a bottle test of samples of untreated bulk water and samples of bulk water treated with a polyacrylate terpolymer of the kinds described herein.

It has been discovered that an effective amount of a cleaning agent comprising a polyacrylate terpolymer and a maleic olefin compound to the aqueous system is shown to remove iron scales and other types of fouling deposits from a metal surface located in the aqueous system containing bulk water and having a pH greater than 6.5.

"Aqueous system" is defined herein to include an aqueous-based fluid, defined as a fluid having more than 50 wt. % or more than 50% vol % water, and any components (e.g. pipes or conduits) through which the aqueous fluid may flow or along or outside of which the aqueous fluid may flow. The aqueous-based fluid may be or include, but is not limited to, water, blowdown, brine, seawater, and combinations thereof. In a non-limiting embodiment, the aqueous based fluid may circulate through an industrial system that utilizes heat exchangers. Such systems may include a cooling tower, a cooling water system, an evaporation system, a boiler system, an air-conditioning system, a wastewater treatment system, a deionized water system, a gas or fluid scrubbing system, a gas or fluid absorption system, and combinations thereof.

As used herein, metal surface is defined to mean any surface upon which fouling or corrosion may occur. Such types of metal surface include, but are not limited to, an iron-containing surface, such as steel; carbon steel; an aluminum-containing surface; yellow metal surfaces, such as copper and copper alloys; and combinations thereof.

The pH of the aqueous system may be greater than about 6.5, alternatively from about 7 independently to about 9, or from about 7.3 independently to about 8.7 in another non-limiting embodiment. As used herein with respect to a range, "independently" means that any threshold may be used together with another threshold to give a suitable alternative range, e.g. about 6.5 to about 8.7 is also considered a suitable alternative range.

In one embodiment, the cleaning agent is comprised of a polyacrylate terpolymer and a maleic olefin compound.

In some embodiments, the polyacrylate terpolymer may be selected from the group consisting of water soluble copolymers and terpolymers of acrylate and maleates having a plurality of hydrophobic groups. Examples of hydrophobic groups are $C_1$-$C_{30}$ alkyl groups, aromatic groups like styrene sulfonate, phosphate containing-acrylates and maleates, vinyl alcohol groups, and combinations thereof. Suitable polyacrylate terpolymers falling within this description include, without limitation, alkyl functionalized poly(AA-AMPS), styrene sulfonate functionalized poly(AA-AMPS), and combinations thereof.

The maleic olefin compound, in one form, is a water soluble maleic olefin polymer having a $C_1$-$C_{30}$ group connected to the maleic olefin backbone through ester, amide, or imide functionalities. The maleic olefin compound, in some instances, has been shown to add surfactancy but not foam to the aqueous system. Examples of maleic olefin compounds useful in the removal of fouling deposits in aqueous systems are anionic maleic olefin copolymers having an average weight of 12000.

In a non-limiting embodiment, the amount of the polyacrylate terpolymer in the cleaning agent ranges from about 0.0001 wt. % to about 1 wt. % and the amount of the polyacrylate terpolymer in the cleaning agent ranges from about 0.00001 wt. % to about 0.001 wt. %, based on the total amount of cleaning agent, based on the total amount of cleaning agent.

The concentration of the cleaning agent introduced to the aqueous system may, for example, range from about 0.01 ppm independently to about 10000 ppm independently based on a total amount of fluid in the aqueous system, alternatively from about 0.1 ppm independently to about 100 ppm independently, or from about 0.5 ppm independently to about 50 ppm independently.

The fouling deposits that may be removed using the cleaning agent include, but are not limited to, iron scales, phosphate scales, carbonate scales, sulfate scales, silica scales and combinations thereof.

In one embodiment, the cleaning agent described herein may remove the fouling deposits from a metal surface, the surface of a heat exchanger tube, for example, by wetting the iron scales to remove them from the surface of the tubes, and then suspending them in the aqueous system. The suspended fouling deposits may then be removed from the system by any means known to be useful to those of ordinary skill in the art. For example, in one embodiment, the suspended fouling deposits may be flushed or carried out of from the aqueous system through blowdown, the process of flushing of a portion of high mineral concentration water out of a system while simultaneously replacing it with fresh water. The cleaning agent may be introduced or added to the aqueous system when the system is either shutdown or in operation.

For purposes of this disclosure, it is not necessary for the fouling deposits to be entirely removed for the cleaning agent discussed herein to be considered effective, although complete removal is a desirable goal. Success is obtained if less corrosion occurs using the additive than in the absence of the additive. Alternatively, the methods and systems described are considered successful if there is at least a 10% decrease in fouling deposits upon metal surfaces within the aqueous system.

In one non-limiting embodiment, the aqueous system may also include corrosion inhibitors such as, but not limited to hydroxycarboxylic acid, hydroxycarboxylic acid salt, zinc, phosphates, molybdates, tin, silicates, and combinations thereof.

In another non-limiting embodiment, the aqueous system may include scale inhibitors such as, but not limited to, phosphonates, polyacrylates, polymaleates, copolymer of polyacrylates, copolymers of polymaleates, and combinations thereof. For instance, the aqueous system may additionally comprise a scale inhibitor such as, but not limited to, polyacrylates of <15000 kDa molecular weight, polymaleates of <15000 kDa molecular weight, phosphonates, and combinations thereof.

In yet another non-limiting embodiment, the aqueous system may include a phosphorous-containing compound such as, but not limited to, phosphinocarboxylic acid, phosphinocarboxylic acid salt, orthophosphates, polyphosphates, phosphonates, HPA, HEDP, and combinations thereof.

Alternatively, the additive and methods described herein may have an absence of an added phosphorous-containing compound.

The aqueous system may also include the following additional components: a biocide, triazoles and/or a chlorine-containing component.

The amount of phosphorous-containing components within the aqueous system prior to the addition of the additive may be less than 30 ppm, or less than about 2 ppm in another non-limiting embodiment. Alternatively, the amount of phosphorous-containing components within the aqueous system may range from about 0 independently to about 0.1 ppm or independently to about 0.2 ppm. It should be understood that in this non-limiting embodiment, the phosphorous-containing components do not include the phosphate compounds previously discussed; for instance, do not include phosphonates.

The biocide may include, but is not limited to, a member selected from the group consisting of sodium hypochlorite (also known as bleach), NaHClO, chlorine dioxide, chlorine, bromine, non-oxidizing biocides, and combinations thereof. Non-limiting examples of the non-oxidizing biocides include isothiazoline; glutaraldehyde; 2,2-dibromo-3-nitrilopropionamide (DBNPA); and combinations thereof. The amount of the biocide present in the aqueous system or added to the aqueous system may range from about 1 ppm independently to about 100 ppm, alternatively from about 5 ppm independently to about 50 ppm, or from about 10 ppm independently to about 25 ppm in another non-limiting embodiment.

In some embodiments, the aqueous system may be stable in the presence of chlorine-containing components, such as chloride salts. The chlorine-containing components may be present in the aqueous system prior to the addition of the hydroxycarboxylic acid(s) or hydroxycarboxylic acid salt(s). Alternatively, the chlorine-containing components may be added to the aqueous system at the same time or different time as the additive disclosed here and be in an amount ranging from about 1 ppm independently to about 2,000 ppm, alternatively from about 50 ppm independently to about 800 ppm, or an amount greater than about 250 ppm in another non-limiting embodiment.

The invention will be further described with respect to the following Examples, which are not meant to limit the invention, but rather to further illustrate the various embodiments.

EXAMPLE 1

FIG. 1 is a photographic illustration comparing the amount of suspension of rust scales in a bottle test of samples of untreated bulk water and samples of bulk water treated with a polyacrylate terpolymer of the kinds described herein.

The center bottle shows the amount of suspension of rust scales in a sample of water synthesized to mimic moderately hard cooling water containing no treatment agent.

The bottle to the left shows the amount of suspension of rust scales in a sample of water synthesized to mimic moderately hard cooling water containing 4 ppm of alkyl functionalized poly(AA-AMPS).

The bottle to the right shows the amount of suspension of rust scales in a sample of water synthesized to mimic moderately hardness cooling water containing 4 ppm of styrene sulfonate functionalized poly(AA-AMPS).

The bottle tests show that the polymers have different abilities to remove and suspend rust scales, the sample containing the styrene sulfonate functionalized poly(AA-AMPS) polymer exhibiting more suspension capability.

EXAMPLE 2

Figure 2:
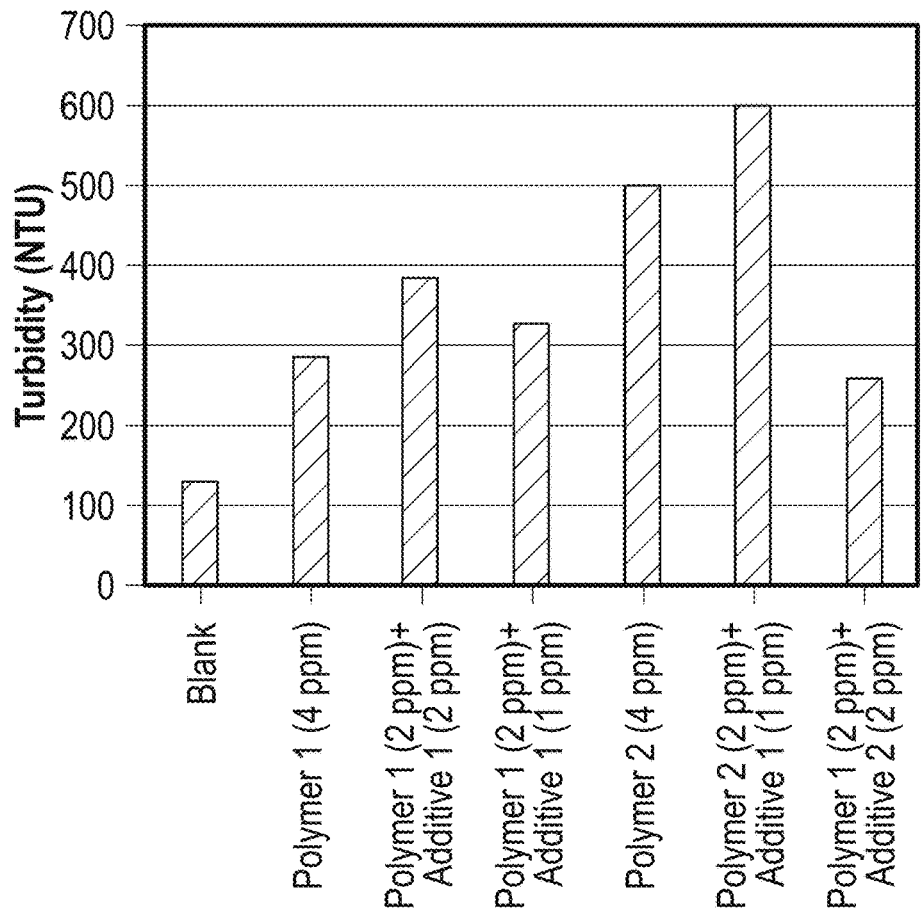
FIG. 2 is a graph comparing the turbidity measurements of a sample of untreated bulk water and samples of bulk water containing various compositions and amounts of a cleaning agent of the kinds described herein.

FIG. 2 is a graph comparing the turbidity measurements of a sample of untreated bulk water and samples of bulk water containing various compositions and amounts of a cleaning agent of the kinds described herein.

The graph shows that the samples containing 4 ppm of styrene sulfonate functionalized poly(AA-AMPS) alone or 2 ppm of styrene sulfonate functionalized poly(AA-AMPS) and 1 ppm of a water soluble maleic olefin polymer had more turbidity than samples containing no treatment agent or those containing alkyl functionalized poly(AA-AMPS) alone or alkyl functionalized poly(AA-AMPS) in combination with a maleic olefin polymer.

It can be inferred that the greater suspension of iron scales in the bulk water increases the turbidity of the bulk water and thus greater ability to remove iron scales from an aqueous system.

EXAMPLE 3

Figure 3:
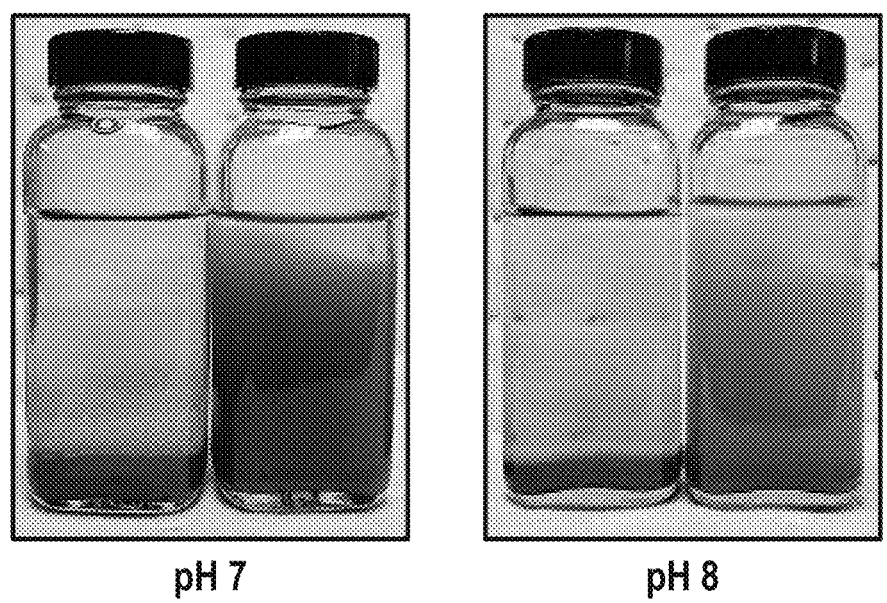
FIG. 3 is a photographic illustration showing the amount of suspension and collection of rust scales in a bottle test of samples of untreated bulk water and bulk water treated with a cleaning agent of the kinds described herein at a pH of 7 versus the amount of suspension and collection of rust scales in a bottle test of samples of untreated bulk water and bulk water treated with a cleaning agent of the kinds described herein at a pH of 8.
Figure 4:
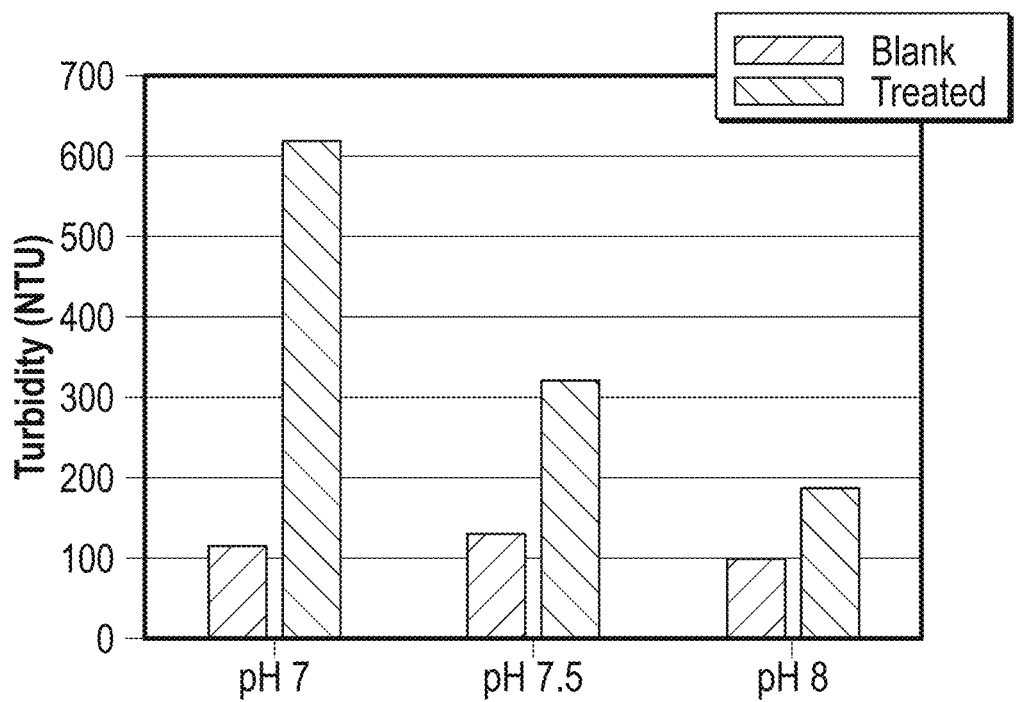
FIG. 4 is graph comparing the turbidity measurements of a sample of untreated bulk water and sample of bulk water treated with a cleaning agent of the kinds described herein at three different pH levels.

FIG. 3 and FIG. 4 reflect the impact of pH level on the performance of a cleaning agent of the kinds described herein.

FIG. 3 is a photographic illustration showing the amount of suspension and collection of rust scales in a bottle test of samples of untreated bulk water and bulk water treated with a cleaning agent of the kinds described herein at a pH of 7 (left-side) versus the amount of suspension and collection of rust scales in a bottle test of samples of untreated bulk water and bulk water treated with a cleaning agent of the kinds described herein at a pH of 8 (right-side). The left-side images in FIG. 3 depict a sample of untreated water and a sample of water treated 4 ppm of alkyl functionalized poly(AA-AMPS). The right-side images in FIG. 3 depict a sample of untreated water and a sample of water treated with 4 ppm of styrene sulfonate functionalized poly(AA-AMPS).

FIG. 4 is graph comparing the turbidity measurements of a sample of untreated bulk water and sample of bulk water treated with a cleaning agent of the kinds described herein at three different pH levels.

As shown in these figures, lowering the pH may increase the wettability, dispersion, and suspension of the rust scales in the bulk water.

EXAMPLE 4

Figure 5:
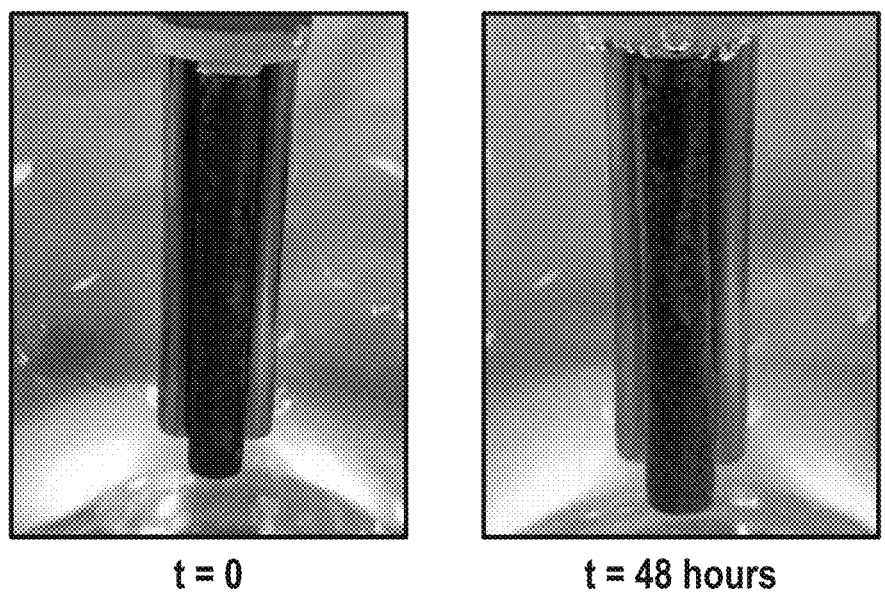
FIG. 5 is a photographic illustration of the effect of cleaning a previously corroded CS1010 coupon tip in an aqueous system having a pH 7 and temperature at 65° C. using a cleaning agent of the kind described herein.

FIG. 5 is a photographic illustration of the effect of cleaning a previously corroded CS1010 coupon tip in an aqueous system having a pH of 7 and at a temperature of 65° C. using 3 ppm of alkyl functionalized poly(AA-AMPS) and 1 ppm maleic olefin copolymer.

The photographs show that a cleaning agent of the kinds described herein is effective in markedly reducing the amount of fouling deposits on a carbon steel surface in an aqueous system having a pH of 7 and a temperature of 65° C. in only two days.

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, metallurgy, equipment, aqueous fluids, aqueous systems, polyacrylate terpolymers, maleic olefin compounds, and other components falling within the claimed parameters, but not specifically identified or disclosed, are expected to be within the scope of this invention.

The present invention may suitably comprise, consist or consist essentially of the elements disclosed and may be practiced in the absence of an element not disclosed. For example, the methods may consist of or consist essentially of adding or introducing a polyacrylate terpolymer and a maleic olefin compound in an effective to remove fouling deposits from a metal surface in an aqueous system.

In another non-limiting embodiment, the cleaning agent may comprise, consist essentially of, or consist of a polyacrylate terpolymer and a maleic olefin compound.

In a different non-restrictive version, a treated aqueous system may comprise, consist essentially of, or consist of: an aqueous system having a metal surface and a cleaning agent made up of from about 0.0001 wt. % to about 1 wt. % polyacrylate terpolymer and from about 0.00001 wt. % to about 0.001 wt. % maleic olefin compound, wherein the treated aqueous system comprises a lower amount of fouling deposits upon a metal surface located in the aqueous system than an aqueous system absent the cleaning agent.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "about" in reference to a given parameter is inclusive of the stated value and has the meaning dictated by the context (e.g., it includes the degree of error associated with measurement of the given parameter).

The invention claimed is:

1. A method of removing fouling deposits from a metal surface in an aqueous system comprising:
   introducing a cleaning agent comprising a polyacrylate terpolymer and a maleic olefin compound to the aqueous system, wherein the maleic olefin compound is a water soluble maleic olefin polymer having a $C_1$-$C_{30}$ group connected to the maleic olefin backbone through ester, amide, or imide functionalities, where the fouling deposits comprises iron scale, the method comprising the cleaning agent wetting the iron scale, and the amount of the cleaning agent being effective to remove fouling deposits from a metal surface located in the aqueous system; and removing the fouling deposits.

2. The method of claim 1, wherein the polyacrylate terpolymer is selected from the group consisting of alkyl functionalized poly(AA-AMPS), styrene sulfonate functionalized poly(AA-AMPS), and combinations thereof.

3. The method of claim 1, wherein the effective amount of the cleaning agent ranges from about 0.1 ppm to about 10000 ppm based on a total amount of fluid in the aqueous system.

4. The method of claim 1, wherein the metal surface is a metal surface of a heat exchanger.

5. The method of claim 1, wherein the aqueous system is selected from the group consisting of a cooling tower, a cooling water system, an evaporation system, a boiler system, an air-conditioning system, a wastewater treatment system, a deionized water system, a gas or fluid scrubbing system, a gas or fluid absorption system, and combinations thereof.

6. The method of claim 1, wherein the aqueous system further comprises at least one component selected from the group consisting of a biocide, a calcium component, a chlorine-containing component, a taggant, a phosphorous compound, and combinations thereof.

7. The method of claim 1, wherein the removal of the fouling deposits from the metal surface comprises wetting the fouling deposits and suspending the fouling deposits in the aqueous system.

8. The method of claim 7, further comprising the step of ejecting the fouling deposits out of the aqueous system through blowdown.

9. The method of claim 1, wherein the metal surface is selected from the group consisting of an iron-containing surface, an aluminum-containing surface, a yellow metal surface, and combinations thereof.

10. The method of claim 1, wherein the aqueous system has a pH from about 6.5 to about 7, where the wettability of the iron scale is improved as compared to a higher pH.

11. The method of claim 1, wherein the cleaning agent is introduced when the aqueous system is shutdown or when the aqueous system is in operation.

12. The method of claim 1, wherein the amount of the polyacrylate terpolymer in the cleaning agent ranges from about 0.0001 wt. % to about 1 wt. %, based on the total amount of cleaning agent.

13. The method of claim 1, wherein the amount of maleic olefin compound in the cleaning agent ranges from 0.00001 wt. % to about 0.001 wt. %, based on the total amount of cleaning agent.

14. The method of claim 1, wherein the fouling deposits are selected from a group consisting of phosphate scales, carbonate scales, sulfate scales, silica scales, and combinations thereof.

15. A treated aqueous system comprising:
an aqueous system having a metal surface having fouling deposits where the fouling deposits comprise iron scale; and
a cleaning agent comprising a polyacrylate terpolymer in an amount ranging from about 0.0001 wt. % to about 1 wt. % based on a total amount of cleaning agent and a maleic olefin compound in an amount ranging from 0.00001 wt. % to about 0.001 wt. % based on a total amount of the cleaning agent where the cleaning agent is present in an amount effective to remove the fouling deposits and where the cleaning agent wets the iron scale, wherein the maleic olefin compound is a water soluble maleic olefin polymer having a $C_1$-$C_{30}$ group connected to the maleic olefin backbone through ester, amide, or imide functionalities.

16. The treated aqueous system of claim 15, wherein the wherein the metal surface is a metal surface of a heat exchanger.

17. The treated aqueous system of claim 15, wherein the aqueous system has a pH from about 6.5 to about 7, where the wettability of the iron scale is improved as compared to a higher pH.

18. The treated aqueous system of claim 15, wherein the fouling deposits are selected from a group consisting of phosphate scales, carbonate scales, sulfate scales, silica scales, and combinations thereof.

19. The treated aqueous system of claim 15, wherein cleaning agent is present in the aqueous system in an amount ranging from about 0.5 ppm to about 50 ppm based on a total amount of fluid in the aqueous system.

* * * * *